United States Patent [19]

Luchessa et al.

[11] 4,292,843
[45] Oct. 6, 1981

[54] TEMPERATURE-COMPENSATED PRECIPITATION GAUGE

[75] Inventors: Charles E. Luchessa, San Rafael; Timothy E. Brown, Danville, both of Calif.

[73] Assignee: Sierra Misco, Inc., Berkeley, Calif.

[21] Appl. No.: 112,654

[22] Filed: Jan. 16, 1980

[51] Int. Cl.³ .............................................. G01W 1/14
[52] U.S. Cl. .................................................... 73/171
[58] Field of Search ........................ 73/171, 219, 431

[56] References Cited

U.S. PATENT DOCUMENTS 3,943,762  3/1976  Baer ..................................... 73/171

FOREIGN PATENT DOCUMENTS 277171  3/1967  Australia .............................. 73/171

Primary Examiner—Jerry W. Myracle
Attorney, Agent, or Firm—Julian Caplan

[57] ABSTRACT

For recording precipitation at a remote station, a vertically mounted pipe is divided into an upper section (into which rain and snow fall) and a lower section. In the upper section is an overflow module consisting of a casing having openings in its bottom communicating with liquid in the upper section so that liquid level inside the casing is at the same level as in the upper section. An overflow pipe extends up from the lower section and through the bottom of the casing. A float and bellows is fixed to the upper end of the overflow pipe and an upper extension pipe is fixed above the bellows. Wires fixed to the upper extension pipe are attached to bi-metallic spirals which work against the bellows. Thus the elevation of the liquid inlet at the upper end of the upper extension pipe is temperature responsive. The upper member is initially partially filled with an antifreeze solution to the level of the liquid inlet. As precipitation enters the upper pipe section, the liquid is maintained at the original level by flow into the casing and into the inlet, from which it drains down to the lower section to actuate a known tipping bucket which controls a reed switch used to control instruments to signal amount of precipitation to a central station. The lower section also contains electronic and transmitting equipment. By separating the two pipe sections, easy and rapid access to the contents of both sections is facilitated.

5 Claims, 5 Drawing Figures

TEMPERATURE-COMPENSATED PRECIPITATION GAUGE

This invention relates to a new and improved temperature compensated precipitation gauge. More particularly, the invention relates to a precipitation gauge installed in remote areas to record and to transmit by radio the amount of rain and snow which falls at a given post for flood warnings, water availability and other predictions.

A feature of the present invention is the provision of an instrument installed inside two outer casing sections positioned interfitting one on top of the other. The lower section is preferably located at least, in substantial part, below ground where it is safe from vandalism. By separating the sections at the joint, access for maintenance and inspection may conveniently be achieved in that all of the parts may be made readily accessible.

Another feature of the invention is the provision of a non-freezing liquid into which both rain and snow are readily dissolved; and, by reason of difference in density, to be thoroughly mixed. Preferably, oil is poured on top of the antifreeze mixture to retard evaporation during warm weather.

A still further feature of the invention is the provision of a temperature compensating means which accommodates expansion and contraction of the water-antifreeze mix even during wide temperature fluctuations.

A further feature of the invention is the provision of a trip bucket counter of known design located where it is very readily accessible for inspection and repair.

A still further feature of the invention is the provision of a reed switch on the trip bucket which is much simpler and less subject to operational failure than switches heretofore in trip bucket installations.

Other objects of the present invention will become apparent upon reading the following specification and referring to the accompanying drawings in which similar characters of reference represent corresponding parts in each of the several views.

Figure 1:
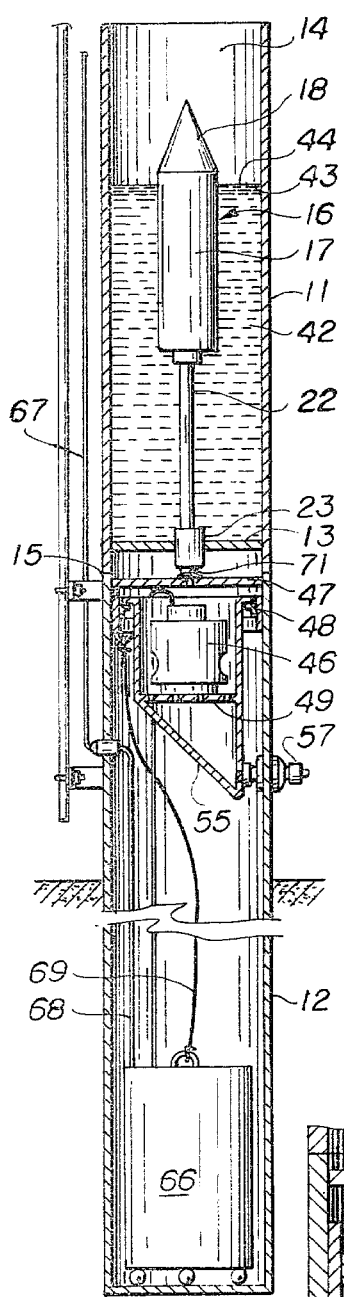
FIG. 1 is a vertical sectional view through the device of the present invention.

Substantially all of the components of the present invention are enclosed within outer casing upper section 11 which is superimposed upon outer casing lower section 12, the two sections meeting in a horizontal joint 15 at which the two sections may be separated for installation, inspection and replacement of components as desired. A water-tight partition 13 is installed in upper section 11 immediately above the joint 15. Section 11 has an open top 14 of known-cross section to receive either rain or snow.

Extending near the top of section 11 is a module 16 in which the temperature compensating components are housed. Module 16 has a tubular body 17 closed off by a conical top 18 so that snow falling on the top 18 slides downward rather than packing at the top of the section 11. Bottom 19 of module 16 is formed with a plurality of holes 21 to provide fluid circulation through the bottom but not through the sides and top. Extending downward from a point within the body 17 and down through the bottom 19 is an overflow pipe 22 which is threaded into a nipple 23 fixed to the partition 13. On top of pipe 22 is a hollow bellows 26, and above bellows 26 is an upward extension 27. Pipe clamps 28 connect opposite ends of the bellows 26 to pipe 22 and to pipe 27, and the relative positions of the parts may be adjusted for calibration of the instrument by adjusting the lengths of wires 39.

Below bellows 26 is a clamp 31 fixed near the upper end of pipe 22. Screwed to the clamp 21 is a pair of bi-metallic spirals 32 having generally horizontally disposed ends 33 formed with horizontally spaced apart holes 34. Vertical tube 36 which is of larger diameter than and surrounds and extends above the upper extension 27 is attached at its lower end to the extension 27 by clamps 37. It will be noted that liquid within the body 17 may circulate up through a gap between the lower ends of tube 36 and extension 37. The upper end 41 of extension 27 constitutes an orifice into which liquid within section 11 and circulating within the body 17 overflows as precipitation falls into the section 11. In other words, inlet 41 determines liquid level 44.

Figure 3:
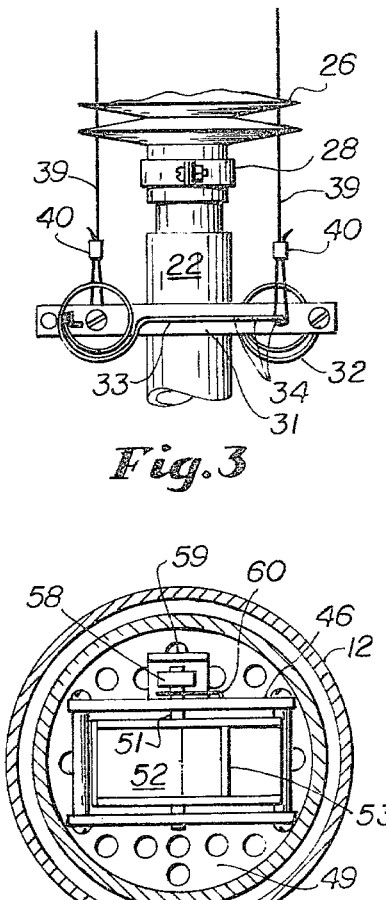
FIG. 3 is an enlarged view of a portion of the structure of FIG. 2 as viewed from the left in FIG. 2.
Figure 5:
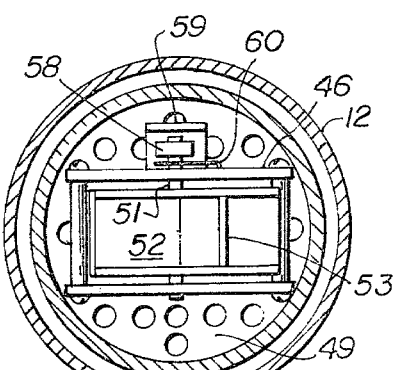
FIG. 5 is a sectional view taken substantially along the line 5—5 of FIG. 4.

Surrounding tube 36 and fixed thereto and hence fixed by means of clamp 37 to extension 27 is an annular float 38. Wires 39 are attached to the horizontal ends 33 of bi-metallic spirals 32 by passing ends of the wires through appropriate holes 34, doubling the wire back and clipping by means of clips 40. By selecting proper holes 34 (see FIG. 3), the device may be adjusted for temperature compensation. The upper ends of wires 39 are fixed to outward bent flanges 45 of tube 36.

It will be observed that with temperature fluctuations, the nominally horizontal ends 33 of the bi-metallic elements rise and fall, pulling down or permitting upward movement of the wires 39. The float 38 floats on the liquid within the module 16 and thus exerts upward force counteracting the downward force at the ends 33. Bellows 26 flex to permit upward and downward movement of the upper extension 27 and its orifice 41.

The upper section 11 is initially filled with an antifreeze mixtures such ethylene glycol 42 to the liquid level 44, and a thin layer of oil 43 is super-imposed upon the antifreeze. The antifreeze rises through the holes 21 in partition 19 and fills the interior of the module 16 up to the overflow level 41. As precipitation enters the upper end 14, it is diverted by the conical top 18 to mix with the antifreeze mixture 42; and as the upper section 11 tends to fill, the liquid drains into the inlet 41, down through the hollow bellows 26 and the overflow pipe 22. Because the specific gravity of the mixture 42 is less than that of water, snow falling into the top 14 tends to drift down in the liquid 42 and thoroughly mix therewith. It is true that there is a slight change in the density in the mixture in the section 11 after substantial moisture has entered, but this is relatively unimportant from the standpoint of practical accuracy of the instrument.

Below the joints 15 are the other principal components of the instrument. Thus, at the top of section 12 is a tipping bucket frame 46 which has a horizontal top 47 formed with an aperture into which the nipple 23 is threaded; and supported near the top of section 12 by annular support 48.

Immediately below the opening in top 47 is overflow director 63 formed with a very accurately centered opening 64 for a purpose which hereinafter appears.

Surrounding frame 46 is bucket casing 61 formed with drain hole 62 at its lower end. Immediately below the frame 46 is an apertured horizontal partition 49 which permits drainage from the hole 62 to pass down through the holes in the partition 49 into the downward-outward slanting lower portion 55 and thence out through drain hole 57 into the atmosphere.

Figure 4:
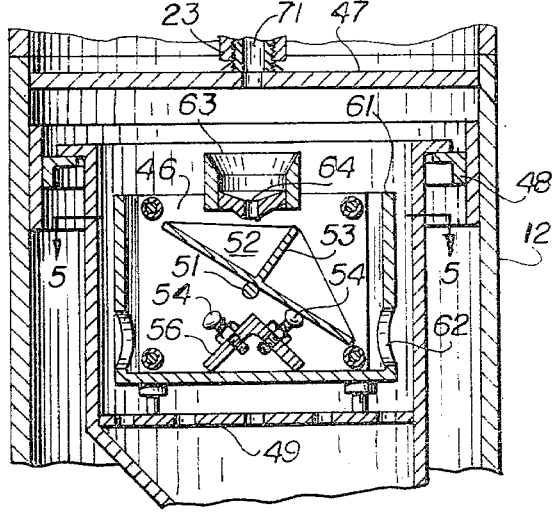
FIG. 4 is an enlarged sectional view of the trip bucket mechanism portion of FIG. 1.
Figure 2:
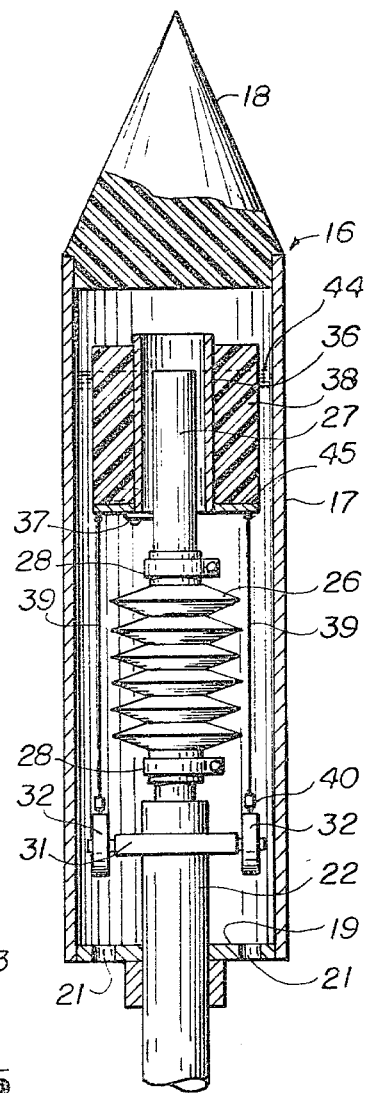
FIG. 2 is an enlarged sectional view through the temperature compensated orifice module shown in FIG. 1.

Extending horizontally transversely of frame 46 is a shaft 51 on which the bucket 52 is fixed for oscillatory movement. Bucket 52 has a central divider 53 perpendicular to the bottom of bucket 52 dividing the bucket into two equal halves. Adjustable stops 54 on either side of stop support 56 fixed to frame 46 limit the extent of oscillatory movement of the bucket 52 in either direction. When the bucket is in the position shown in FIG. 4, water flowing down the overflow pipes 22 is directed to the left side of the bucket (i.e., to the left of the partition 53). As the weight of the liquid increases, the bucket 52 tilts in a counterclockwise direction and it then tips until the bottom of bucket 52 rests on the left-hand stop 54 instead of the right-hand stop. By reason of the accurate positioning of the opening 64, the water is delivered first to one side and then to the other side of the bucket. After the bucket is tilted from one side to the other, the contents of the downward moving side drain out through the hole 62 and the holes in the partition 49 and eventually out through the drain 57 to the atmosphere.

Shaft 51 carries a magnet 58 outside the bucket frame 46 and protected by a guard 59. Thus, each time the bucket tilts in one direction or the other, magnet 58 passes across reed switch 50 fixed to frame 46, causing the contacts of switch 60 to change position and through electronic circuitry not illustrated or herein described, periodically a signal is emitted from the transmitter 66 located in the bottom of section 12.

One of the features of the invention is the fact that the transmitter 66, which is very vulnerable to vandalism is located at the bottom of the section 12 and preferably well below ground. It may be raised and lowered after the tipping bucket has been removed by means of rope 69. A cable 68 extends up from the transmitter 66 to the antenna 67 which rises to a considerable elevation to improve transmission.

Hence, as precipitation falls into the liquid 42 within the upper casing section 11, liquid rises through the module 16 and overflows through inlet 41, and thence down into the nipple 23 and overflow director 63 and into the bucket 52, causing the bucket to tilt periodically depending upon the rate of fall of precipitation. Periodic closing of the switch 60 as the bucket tilts causes the transmitter 66 to emit the signal through the antenna 67 to a remote station where data is collected.

It is important to note that the pipe sections 11 and 12 interfit at joint 15, which is preferably about four feet above ground level, while the lower end of pipe 12 is well below ground. Thus, the transmitter 66 is not readily accessible to vandalism. When access to the equipment is required, section 11 is turned, unthreading nipple 23 from interfitting nipple 31 fixed to top 47. Section 11 may then be lifted away. Access to the module 16 is readily apparent. Access to the tipping bucket is also easy. By lifting top 47 from support 48 the tipping bucket may be removed. Rope 69 may be pulled to raise transmitter 66 and other equipment in the bottom of section 12.

What is claimed is:

1. A precipitation gauge comprising a first cylindrical pipe, a second cylindrical pipe superimposed upon and concentric with said first pipe, said pipes meeting at a joint, said first pipe having a water-tight compartment immediately above said joint, said first pipe having an open top admitting precipitation into said first pipe, a module in said first pipe comprising a body, a perforate bottom for said body and overflow collecting means, said overflow means comprising an inlet near the top of said body and a drain pipe receiving the liquid entering said inlet and extending through said compartment and having first coupling means at said joint, said second pipe having a tipping bucket liquid measuring member at its upper end having a top having second coupling means cooperable with said first coupling means to secure said pipes together at said joint and also to conduct liquid into said tipping bucket member, a transmitter at the bottom of said second pipe, said tipping bucket member tipping as liquid enters same and emitting an electric signal as it tips, said transmitter emitting a radio signal dependent on the number of times said tipping bucket member tips, whereby upon uncoupling said coupling means, said first pipe may be lifted from said second pipe providing access to the contents of both said pipes.

2. A gauge according to claim 1 in which said coupling means comprises internally and externally threaded pipes.

3. A gauge according to claim 1 which further comprises a conical top on said body deflecting snow off said module.

4. A gauge according to claim 1 which further comprises temperature compensating means in said overflow means positioned to raise and lower said inlet with variations in temperature.

5. A gauge according to claim 4 in which said compensating means comprises a bimetallic coil fixed to said drain pipe, a bellows above said drain pipe, an upper extension above said bellows, a float fixed to said upper extension, and means interconnecting said bimetallic coil and said float.

* * * * *